(12) United States Patent
Sasaki et al.

(10) Patent No.: US 7,870,845 B2
(45) Date of Patent: Jan. 18, 2011

(54) FUEL INJECTION CONTROL DEVICE AND FUEL INJECTION CONTROL SYSTEM

(75) Inventors: Satoru Sasaki, Kariya (JP); Tokuji Kuronita, Kariya (JP); Youhei Morimoto, Kariya (JP)

(73) Assignee: Denso Corporation, Kariya (JP)

( * ) Notice: Subject to any disclaimer, the term of this patent is extended or adjusted under 35 U.S.C. 154(b) by 229 days.

(21) Appl. No.: 12/192,303

(22) Filed: Aug. 15, 2008

(65) Prior Publication Data

US 2009/0055083 A1 Feb. 26, 2009

(30) Foreign Application Priority Data

Aug. 20, 2007 (JP) ............... 2007-213334

(51) Int. Cl.
*F02B 3/00* (2006.01)
*F02B 3/02* (2006.01)

(52) U.S. Cl. ................... 123/435; 123/299

(58) Field of Classification Search ........... 123/435, 123/299, 300, 304, 494, 1 A; 701/103, 104
See application file for complete search history.

(56) References Cited

U.S. PATENT DOCUMENTS

| 6,877,479 | B2 * | 4/2005 | Miura ................... 123/319 |
| 2003/0164166 | A1 * | 9/2003 | Takeuchi et al. ............ 123/674 |
| 2003/0233998 | A1 * | 12/2003 | Futonagane et al. ......... 123/299 |
| 2007/0012290 | A1 | 1/2007 | Yamaguchi et al. |
| 2008/0167786 | A1 | 7/2008 | Sasaki et al. |
| 2008/0172169 | A1 | 7/2008 | Kuronita et al. |

FOREIGN PATENT DOCUMENTS

| JP | 06-159182 | 6/1994 |
| JP | 11-141386 | 5/1999 |
| JP | 11-148410 | 6/1999 |
| JP | 2005-061239 | 3/2005 |

OTHER PUBLICATIONS

JP2005061239 (Taro Aoyama et al.) Mar. 10, 2005 (machine translation). [online] [retrieved on May 29, 2010]. Retrieved from : JPO Database.*
Japanese Office Action dated Jan. 6, 2010, issued in corresponding Japanese Application No. 2007-213334, with English translation.

* cited by examiner

*Primary Examiner*—Mahmoud Gimie
(74) *Attorney, Agent, or Firm*—Nixon & Vanderhye P.C.

(57) ABSTRACT

A fuel injection control device controls an operation of an injector such that fuel to be injected into a combustion chamber per combustion cycle is divided and injected at least through a first injection and a second injection, which is performed with a larger fuel quantity than the first injection after the first injection. The fuel injection control device includes an acquiring section and a first combustion state estimating section. The acquiring section acquires a sensing value of cylinder pressure in the combustion chamber sensed with a cylinder pressure sensor. The first combustion state estimating section estimates an actual combustion state of the fuel injected by the first injection based upon a second combustion timing cylinder pressure sensing value attributable to combustion of the fuel injected by the second injection out of the cylinder pressure sensing values.

22 Claims, 7 Drawing Sheets

US 7,870,845 B2

FUEL INJECTION CONTROL DEVICE AND FUEL INJECTION CONTROL SYSTEM

CROSS REFERENCE TO RELATED APPLICATION

This application is based on and incorporates herein by reference Japanese Patent Application No. 2007-213334 filed on Aug. 20, 2007.

BACKGROUND OF THE INVENTION

1. Field of the Invention

The present invention relates to a fuel injection control device and a fuel injection control system for controlling an operation of an injector such that fuel to be injected into a combustion chamber per combustion cycle is divided and injected through multiple times of injections.

2. Description of Related Art

There is conventionally known a fuel injection control device that controls an operation of an injector such that fuel to be injected into a combustion chamber per combustion cycle is divided and injected through multiple times of injections. For example, a technology described in each of Patent document 1 (JP-A-H11-148410) and Patent document 2 (JP-A-H11-141386) performs an injection of a small quantity of fuel through a pilot injection (first injection) prior to a main injection (second injection). The pilot injection exerts following effects (1) and (2).

(1) Since combustion of the fuel injected by the pilot injection (referred to as pilot combustion hereinafter) occurs before combustion of the fuel injected by the main injection (referred to as main combustion hereinafter), temperature of a wall surface of a combustion chamber is increased before start of the main combustion. In consequence, an ignition delay of the main combustion is inhibited to reduce a combustion noise.

(2) Since a premixed gas formed by the pilot injection burns in an early stage of the main combustion, an injection quantity to be injected by the main injection can be reduced. In consequence, combustion gas temperature can be reduced to reduce a production of NOx.

The technology described in Patent document 1 estimates an injection quantity actually injected by the pilot injection and controls the pilot injection such that a deviation between the estimated injection quantity and a target quantity becomes zero. In the estimation, change of cylinder pressure attributable to the pilot combustion is sensed with a cylinder pressure sensor, and a heat production Iq (shown by a shaded area in part (b) of FIG. 5) by the pilot combustion is calculated based upon the sensing result. Then, a pilot injection quantity is estimated based upon the calculated heat production Iq.

However, since the pilot injection quantity is much smaller than the main injection quantity, the change in the cylinder pressure (change in the heat production Iq) caused by the pilot combustion is extremely small. Therefore, high accuracy is required of a cylinder pressure sensor to estimate the pilot injection quantity with high accuracy, leading to an increase of cost.

In a multistage injection (referred to as multi-injection, hereinafter) of dividing a fuel quantity and performing injection of the divided fuel quantity in multiple times during a combustion cycle, the fuel quantity injected through each injection is small. Therefore, not only for the pilot injection exerting the above-described effects (1) and (2) but also for other injections, high accuracy is required of the cylinder pressure sensor in order to estimate the injection quantity as described above.

SUMMARY OF THE INVENTION

It is an object of the present invention to provide a fuel injection control device or a fuel injection control system capable of reducing accuracy required of a cylinder pressure sensor when estimating a combustion state of fuel divided and injected through multiple injections based upon a cylinder pressure sensing value.

According to an aspect of the present invention, a fuel injection control device controls an operation of an injector such that fuel to be injected into a combustion chamber per combustion cycle is divided and injected at least through a first injection and a second injection, which is performed with a larger fuel quantity than the first injection after the first injection. The fuel injection control device includes an acquiring section and a first combustion state estimating section. The acquiring section acquires a sensing value of cylinder pressure in the combustion chamber sensed with a cylinder pressure sensor. The first combustion state estimating section estimates an actual combustion state of the fuel injected through the first injection based upon a second combustion timing cylinder pressure sensing value attributable to combustion of the fuel injected by the second injection out of the cylinder pressure sensing values.

The inventors of the present invention made the above aspect of the invention by focusing attention on following points. That is, the actual combustion state of the fuel by the first injection affects the combustion (first combustion) of the fuel injected by the first injection and also the combustion (second combustion) of the fuel injected by the second injection. Further, in the case where the second injection injects a larger quantity of the fuel than the first injection, if the combustion state of the fuel injected by the first injection changes, the cylinder pressure attributable to the second combustion (referred to as second combustion timing cylinder pressure) changes more largely than the cylinder pressure attributable to the first combustion (referred to as first combustion timing cylinder pressure).

According to the above aspect of present invention made in view of these points, in the case where the second injection injects a larger quantity of the fuel than the first injection, the actual combustion state of the fuel injected by the first injection is estimated based upon the sensing value relating to the second combustion timing cylinder pressure among the cylinder pressure sensing values. The change in the second combustion timing cylinder pressure accompanying the change in the combustion state attributable to the first injection is larger than the change in the first combustion timing cylinder pressure. Therefore, the accuracy level required of the cylinder pressure sensor can be reduced as compared to the technology described in Patent document 1 that estimates the combustion state attributable to the first injection based upon the first combustion timing cylinder pressure that causes only a slight change.

According to another aspect of the present invention, the combustion state estimated by the first combustion state estimating section includes at least one of a heat production by the first injection and an actual injection quantity of the first injection. Accordingly, for example, the operation of the injector may be controlled to conform the estimated heat production to a target heat production or to conform the estimated actual injection quantity to a target injection quantity. When the heat production, the actual injection quantity or the actual injection timing is estimated, a value relating to each of the values may be estimated. An example of the value relating to the heat production includes a peak value of a heat release rate (heat production per unit time), an increasing speed of the heat release rate and the like.

The combustion state of the fuel injected by the first injection is also changed by following state changes in addition to the changes of the heat production and the actual injection quantity.

(1) Change of the actual injection timing of the first injection or fuel properties (for example, a cetane number).
(2) Aging change of a spray state (for example, an injection pattern specified by an injection hole shape of an injector or an arrangement of the injector).
(3) Aging change of an internal combustion engine (for example, change of a compression ratio)

Accordingly, the combustion state estimated by the first combustion state estimating section may include the above state (1), (2) or (3) in addition to the heat production and the actual injection quantity However, an influence of the change in the first combustion timing cylinder pressure occurs more remarkably in the change of the heat production or the actual injection quantity than in the above state (1), (2) or (3). Therefore, it is preferable to use the heat production or the actual injection quantity as the combustion state estimated by the first combustion state estimating section.

As described above, the actual combustion state of the fuel injected by the first injection also affects the second combustion. Particularly, the combustion state of the fuel injected by the first injection affects the rising time of the second combustion the most remarkably in the second combustion. For example, the rising time of the second injection shortens as shown in part (a) of FIG. 6 as an injection quantity of the first injection reduces (or as the injection timing advances). The rising time of the second injection lengthens as shown in part (c) of FIG. 6 as the injection quantity of the first injection increases (or as the injection timing delays).

According to another aspect of the present invention made in view of this point, the first combustion state estimating section estimates the combustion state based upon the second combustion timing cylinder pressure sensing value at the time when the second combustion timing cylinder pressure sensing value increases. Thus, by estimating the combustion state based upon a temporal change during the increase of the cylinder pressure, in which the temporal change occurs as a large change, the estimation accuracy of the combustion state can be improved. This means that the accuracy level required of the cylinder pressure sensor can be further reduced.

Concerning the estimation of the actual combustion state of the fuel injected by the first injection based upon the second combustion timing cylinder pressure sensing value, a following example can be presented. That is, a method of calculating a heat production Iq (refer to part (b) of FIG. 5) caused by the pilot combustion as in Patent document 1 is used to calculate a heat production Iqm (for example, shown by a dotted area in part (b) of FIG. 5) caused by the main combustion, and a pilot injection quantity is estimated based on the heat production Iqm. However, the heat production Iqm calculated in this way is a value that is calculated by integrating values of the heat release rate H at respective times (values indicated with a vertical axis in part (b) of FIG. 5) and contains entire sensing errors (cylinder pressure sensing errors) contained in the respective values of the heat release rate H.

According to another aspect of the present invention made in view of this point, the first combustion state estimating section estimates the combustion state based upon a time required for the second combustion timing cylinder pressure sensing value to change by a predetermined amount. Since the above time can be calculated from a difference (Tdqm) between a start time of the change of the predetermined amount (for example, time t1 shown in part (b) of FIG. 5) and an end time (t2) of the same, the integration of the cylinder pressure sensing values of the heat release rate as described above is unnecessary. Therefore, the sensing error of the value of the heat release rate contained in the above time is smaller than the sensing error contained in the heat production Iqm obtained by integrating the heat release rate. In consequence, the estimation accuracy of the combustion state can be improved. This means that the accuracy level required of the cylinder pressure sensor can be further reduced.

According to another aspect of the present invention made in view of the above finding that the actual combustion state of the fuel injected by the first injection affects the rising time in the second combustion the most remarkably, the predetermined amount is set as an increase amount of the second combustion timing cylinder pressure sensing value at the time when the second combustion timing cylinder pressure sensing value increases. Thus, by estimating the combustion state based upon a temporal change during the increase of the cylinder pressure, in which the temporal change occurs as a large change, the estimation accuracy of the combustion state can be improved. This means that the accuracy level required of the cylinder pressure sensor can be further reduced.

According to another aspect of the present invention, the first combustion state estimating section estimates the combustion state based upon a time in which the second combustion timing cylinder pressure sensing value is greater than a predetermined value.

When the combustion state of the fuel injected by the first injection is estimated based upon the second combustion timing cylinder pressure sensing value as described above, for example, the second combustion timing cylinder pressure sensing value may be used as it is and the combustion state of the fuel injected by the first injection may be estimated based upon a correlation between the change of the second combustion timing cylinder pressure sensing value and the combustion state of the fuel injected by the first injection. Alternatively, according to another aspect of the present invention, the heat release rate attributable to the combustion of the fuel injected by the second injection may be calculated based upon the second combustion timing cylinder pressure sensing value and the combustion state may be estimated based upon the heat release rate.

According to another aspect of the present invention, the first combustion state estimating section estimates the combustion state based upon a time required for the heat release rate to change by a predetermined amount. As described above, the above time can be calculated from the difference (Tdqm) between the start time of the change of the predetermined amount (for example, time t1 shown in part (b) of FIG. 5) and the end time (t2) of the same. Therefore, the sensing error of the heat release rate contained in the time is smaller than in the heat production Iqm calculated by integrating the heat release rate. In consequence, the estimation accuracy of the combustion state can be improved. This means that, the accuracy level required of the cylinder pressure sensor can be further reduced.

As described above, the combustion state of the fuel injected by the first injection affects the rising time in the second combustion the most remarkably. According to another aspect of the present invention made in view of this point, the predetermined amount is set as an increase amount of the heat release rate at the time when the heat release rate increases. Thus, the combustion state is estimated based upon a temporal change in the heat release rate during the increase of the heat release rate, in which the temporal change occurs as a large change. Therefore, the estimation accuracy of the combustion state can be improved. This means that the accuracy level required of the cylinder pressure sensor can be further reduced.

According to another aspect of the present invention, the first combustion state estimating section estimates the combustion state based upon a time, in which the heat release rate is greater than a predetermined value.

According to another aspect of the present invention, the second injection is a main injection, an injection quantity and injection timing of which are controlled to produce main part of output torque during one combustion cycle. In general, the injection quantity injected by the main injection is larger than that of other injection. Therefore, the combustion of the fuel injected by the main injection is largely affected by the combustion state of the fuel injected by the first injection. For example, even if the first injection quantity is slightly changed, the second combustion timing cylinder pressure largely changes. Therefore, according to the above aspect of the present invention of estimating the combustion state based upon the second combustion timing cylinder pressure that largely changes with the change of the combustion state attributable to the first injection, the estimation accuracy of the combustion state can be improved. This means that the accuracy level required of the cylinder pressure sensor can be further reduced.

In an example, the main injection is set such that the fuel injected by the main injection ignites near a compression top dead center within the injection period. In another example, the main injection is set such that the main injection is performed within a range of 0° CA to 15° CA after a top dead center.

According to another aspect of the present invention, the first injection is a pilot injection that completes fuel injection before a compression top dead center, an injection quantity and injection timing of the pilot injection being controlled such that a part of the fuel injected through the pilot injection combusts together with the fuel injected through the main injection after a premixing period. In general, such a pilot injection largely affects the combustion state of the fuel injected by the main injection. For example, even if the pilot injection quantity is slightly changed, the second combustion timing cylinder pressure largely changes. Therefore, according to the above aspect of the present invention, the estimation accuracy of the combustion state can be improved. This means that the accuracy level required of the cylinder pressure sensor can be further reduced.

According to another aspect of the present invention, the fuel injection control device includes a second injection timing control section for performing feedback-control of injection timing of the second injection to approximate actual ignition timing, at which the fuel injected through the second injection actually ignites, to target ignition timing. The first combustion state estimating section estimates the combustion state based upon the second combustion timing cylinder pressure sensing value at the time when a deviation between the actual ignition timing and the target ignition timing is less than a predetermined amount.

When the deviation between the actual ignition timing and the target ignition timing is large, although the state of the first combustion affects the second combustion, the correlation between the first combustion and the second combustion is weak. Therefore, it is difficult to estimate the state of the first combustion from the second combustion. In this regard, according to the above aspect of the present invention, the state of the first combustion is estimated based upon the second combustion timing cylinder pressure sensing value at the time when the deviation between the actual ignition timing and the target ignition timing is less than the predetermined value. Therefore, the estimation accuracy can be improved.

According to another aspect of the present invention, a fuel injection control device controls an operation of an injector such that fuel to be injected into a combustion chamber per combustion cycle is divided and injected at least through a first injection and a second injection performed after the first injection. The second injection is a main injection, an injection quantity and injection timing of which are controlled such that the fuel injected through the main injection ignites near a compression top dead center within an injection period. The fuel injection control device includes an acquiring section and a first combustion state estimating section. The acquiring section acquires a sensing value of cylinder pressure in the combustion chamber sensed with a cylinder pressure sensor. The first combustion state estimating section estimates an actual combustion state of the fuel injected through the first injection based upon a second combustion timing cylinder pressure sensing value attributable to combustion of the fuel injected by the second injection out of the cylinder pressure sensing values.

While the second injection according to the first aspect of the present invention injects a larger quantity of the fuel than the first injection, the second injection according to this aspect of the present invention is the main injection, the injection quantity and the injection timing of which are controlled to produce main part of the output torque during one combustion cycle. In the case of such the main injection, even if the main injection does not inject a larger quantity of the fuel than the first injection, it can be said that the actual combustion state of the fuel injected by the first injection also affects the combustion (second combustion) of the fuel injected by the second injection (main injection) performed after the first injection. Therefore, this aspect of the present invention also achieves the same effect as that of the first aspect.

According to yet another aspect of the present invention, a fuel injection control system includes the fuel injection control device according to one of the above aspects and at least one of the injector for injecting the fuel into the combustion chamber and the cylinder pressure sensor for sensing the cylinder pressure in the combustion chamber. The fuel injection control system can exert the same effects as the aforementioned various effects.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereinafter, a fuel injection control device according to embodiments of the present invention will be described with reference to the drawings. In the following description, as an example, a case where the fuel injection control device is incorporated in a system (an engine control system) for performing engine control of a reciprocating engine (an internal combustion engine) for a four-wheeled vehicle will be explained.

Figure 1:
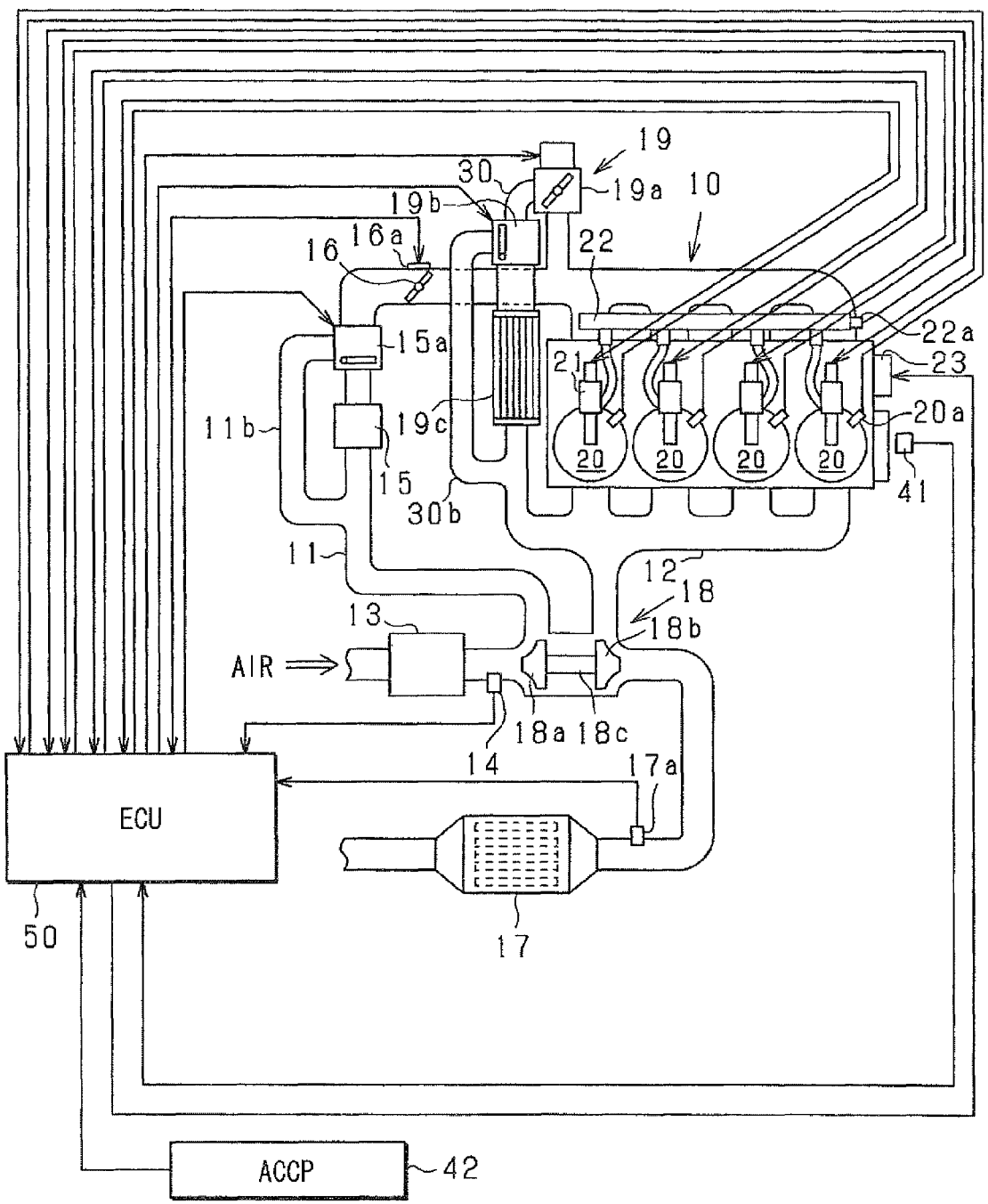
FIG. 1 is a construction diagram showing an outline of a vehicle control system functioning as a fuel injection control system according to a first embodiment of the present invention.

FIG. 1 is a construction diagram showing an outline of a vehicle control system mounted with a fuel injection control device according to a first embodiment of the present invention. As shown in FIG. 1, the engine control system performs control of a four-cylinder diesel engine 10 equipped with a common rail fuel injection device. The engine control system shown in FIG. 1 has various sensors, an ECU 50 (electronic control unit) and the like for controlling the engine 10. Hereinafter, respective components constituting the system including the engine 10 as the control target will be described in detail.

The engine 10 is constructed by accommodating pistons (not shown) respectively in four cylinders 20. A rotational position (and eventually, rotation speed and the like) of a crankshaft (an output shaft) provided to the pistons can be sensed with a crank angle sensor 41. That is, the crank angle sensor 41 is configured to output a crank angle signal to the ECU 50 at every predetermined crank angle (for example, in a cycle of 30° CA).

A variable valve mechanism 23 is provided to a camshaft as a valve operating mechanism for an intake valve and an exhaust valve. The variable valve mechanism 23 continuously varies valve opening/closing operation conditions such as valve opening/closing timing and a valve overlap amount of the intake valve and the exhaust valve with a known variable valve timing mechanism (VTC). In this system, a sensor output of a cam position sensor is sequentially inputted to the ECU 50. The variable valve mechanism 23 is appropriately operated according to a command from the ECU 50 to realize an optimal valve opening/closing operation condition in accordance with an engine operating state, a demand of a driver or the like at each time.

An airflow meter 14 is provided in an intake pipe 11 constituting an intake system of the engine 10 for sensing a quantity of a fresh air taken in through an air cleaner 13 located at the most upstream portion of the intake pipe 11. An intercooler 15 (a cooling device) is provided in the intake pipe 11 for cooling the intake air. A bypass passage 11b bypassing the intercooler 15 is formed in the intake pipe 11. A ratio between the intake air cooled by the intercooler 15 and the intake air flowing through the bypass passage 11b is regulated by adjusting an opening degree of a bypass valve 15a.

An electronically controlled throttle valve 16 is provided downstream of the intercooler 15, or in more detail, downstream of the bypass valve 15a provided at a junction point of the bypass passage 11b. An opening degree of the throttle valve 16 is electronically adjusted by an actuator such as a DC motor. The throttle valve 16 is provided with a throttle position sensor 16a for sensing a position (i.e., the opening degree) or movement (i.e., change in the position) of the throttle valve 16.

A DPF 17 (diesel particulate filter) is provided in an exhaust pipe 12 constituting an exhaust system of the engine 10. The DPF 17 functions as an exhaust gas purification device for collecting particulate matters (PM) in the exhaust gas. An exhaust gas temperature sensor 17a is provided upstream of the DPF 17 for sensing exhaust gas temperature. The DPF 17 is a continuously-regenerative PM removal filter for collecting the particulate matters in the exhaust gas. For example, the DPF 17 can be continuously used by repeatedly performing combustion and removal of the collected particulate matters (i.e., regeneration processing), e.g., through a post-injection performed after a main injection, which produces main part of output torque. The DPF 17 supports a platinum-based oxidation catalyst (not shown) to remove HC and CO as well as a soluble organic fraction (SOF) as one of the particulate matter constituents.

An injector 21 and a cylinder pressure sensor 20a are further provided in the combustion chamber of each cylinder 20. The injector 21 is an electromagnetic drive injector that performs injection supply of fuel (light oil), which is used for combustion in the combustion chamber, directly into the combustion chamber. The cylinder pressure sensor 20a senses pressure (cylinder pressure) at a sensing portion provided in the combustion chamber (i.e., a tip end of a probe inserted into the combustion chamber).

High-pressure fuel is sequentially pumped from a fuel pump (not shown) to a common rail 22 such that the common rail 22 accumulates the fuel at high pressure equivalent to injection pressure. The injector 21 is connected to the common rail 22 as a pressure accumulation pipe through a high-pressure fuel pipe. The common rail 22 is provided with a fuel pressure sensor 22a for sensing the fuel pressure in the common rail 22 (common rail pressure). Thus, original pressure of the fuel to be injected and supplied by each injector 21 can be monitored at any time.

In the engine 10 (diesel engine) according to the present embodiment, a required quantity of the fuel is injected and supplied to each cylinder 20 as needed by a valve-opening drive of the injector 21. That is, during the operation of the engine 10, the intake air is introduced from the intake pipe 11 to the combustion chamber of the cylinder 20 by an opening action of the intake valve and is then mixed with the fuel injected and supplied from the injector 21 to form a mixture gas. The mixture gas is compressed by the piston in the cylinder 20, thereby the mixture gas ignites (through self ignition) and combusts. Exhaust gas formed by the combustion is discharged to the exhaust pipe 12 by an opening action of the exhaust valve.

A turbocharger 18 is arranged between the intake pipe 11 and the exhaust pipe 12. The turbocharger 18 has an intake compressor 18a provided in the intake pipe 11 and an exhaust turbine 18b provided in the exhaust pipe 12. The compressor 18a and the turbine 18b are connected through a shaft 18c. That is, the exhaust gas flowing through the exhaust pipe 12 rotates the exhaust turbine 18b and the rotational force of the exhaust turbine 18b is transmitted to the intake compressor

18a through the shaft 18c. The intake compressor 18a compresses the air flowing through the intake pipe 11, thereby supercharging the air. The supercharging improves a charging efficiency of the intake air to each cylinder 20. In the supercharging, the supercharged air is cooled by the intercooler 15, thereby further improving the charging efficiency to each cylinder 20.

An EGR device 19 is also arranged between the intake pipe 11 and the exhaust pipe 12 for recirculating a part of the exhaust gas as an EGR (exhaust gas recirculation) gas to the intake system. The EGR device 19 is constituted by an EGR pipe 30, which connects the intake pipe 11 and the exhaust pipe 12, and an EGR valve 19a consisting of an electromagnetic valve and the like. The electromagnetic valve of the EGR valve 19a is provided downstream of the throttle valve 16 in the intake pipe 11 and can adjust a passage area of the EGR pipe 30 and eventually an EGR ratio by a valve opening degree thereof. The EGR ratio is a ratio of a quantity of the EGR gas recirculated to the cylinder to the quantity of the entire exhaust gas.

A water-cooling type EGR cooler 19c (a cooling device) for cooling the EGR gas with a coolant is provided in the EGR pipe 30 (i.e., a communication passage between the intake passage and the exhaust passage). A bypass passage 30b bypassing the EGR cooler 19c is formed in the EGR pipe 30. The EGR device 19 is structured such that a recirculation route of the exhaust gas is decided by a state of the bypass valve 19b. The EGR device 19 can lower combustion temperature by recirculating a part of the exhaust gas to the intake system through the EGR pipe 30, thereby inhibiting the generation of the NOx. Further, by performing selection (switching) of the recirculation route and variable control of the flow passage area with the bypass valve 19b, a ratio between the exhaust gas cooled by the EGR cooler 19c and the exhaust gas flowing through the bypass passage 30b can be adjusted.

In addition to the outputs (the sensing signals) of the above-described sensors, signals from various sensors such as an accelerator sensor 42 for sensing an operation amount of an accelerator by a driver (i.e., an accelerator position ACCP) are sequentially inputted to the ECU 50 functioning as the engine control device. The ECU 50 operates various actuators such as the injector 21 based upon the sensing signals of the various sensors to control an operation state of the engine 10.

In more detail, the ECU 50 includes a microcomputer (not shown). The microcomputer is basically constituted by various computation devices, storage devices, signal processing devices, communication devices and the like such as a CPU (basic processing unit) for performing various types of computation, a RAM (random access memory) as a main memory for temporarily storing data in the process of the computation, computation results and the like, a ROM (read only memory) as a program memory, an EEPROM (electrically rewritable nonvolatile memory) as a memory for data storage, a backup RAM (RAM supplied with power by a backup power supply such as an in-vehicle battery), signal processing devices such as an A/D converter and a clock generating circuit and input/output ports for inputting/outputting signals from/to an outside.

Further, in the present embodiment, a high-speed digital signal processing processor (DSP) is provided in addition to the CPU to improve processing speed of the signal processing performed in the control (particularly, signal processing concerning the output of the cylinder pressure sensor 20a). The ROM beforehand stores various programs, control maps and the like concerning the engine control including a program concerning the injection control. The data storage memory (for example, the EEPROM) beforehand stores various control data and the like including design data of the engine 10.

In the present embodiment, the ECU 50 calculates a fuel injection quantity (as an engine control amount) based upon the sequentially inputted various sensor outputs (the sensing signals) and controls the engine torque (output torque) produced through combustion in the engine 10 based upon the fuel injection quantity. That is, for example, the ECU 50 calculates the fuel injection quantity in accordance with the accelerator operation amount ACCP of the driver and outputs an injection control signal directing a fuel injection with the fuel injection quantity to the injector 21 at injection timing corresponding to an engine operation state of each time. In consequence, the output torque of the engine 10 is controlled to a target value based upon a drive amount of the injector 21 (for example, a valve-opening period).

The diesel engine performs combustion by self-ignition and an intake throttle valve (the throttle valve 16) provided in the intake passage of the engine 10 is normally held at a constant opening degree (for example, in a fully-opened state). Therefore, the control of the fuel injection quantity is a main part of combustion control of the engine 10.

In the present embodiment, as in the case of the device described in each of Patent documents 1 and 2 mentioned above, the fuel injection control is performed in the form of the multi-injection (multistage injection). That is, in one combustion cycle, before a main injection (second injection) for generating the output torque, a pilot injection (first injection) is performed with an injection quantity smaller than an injection quantity of the main injection. The main injection is an injection, an injection quantity and injection timing of which are controlled such that the fuel injected through the main injection ignites near a compression top dead center within the injection period. The pilot injection is an injection, an injection quantity and injection timing of which are controlled such that the fuel injection is completed before the compression top dead center and a part of the fuel injected through the pilot injection ignites near the compression top dead center after a premixing period.

Accordingly, the pilot injection exerts following effects. That is, since the combustion of the fuel injected by the pilot injection (hereinafter, referred to as pilot combustion or first combustion) occurs before the combustion of the fuel injected by the main injection (hereinafter, referred to as main combustion or second combustion), wall surface temperature of the combustion chamber is increased before start of the main combustion. In consequence, an ignition delay of the main combustion can be restricted, thereby reducing a combustion noise caused by rapid combustion of the fuel in a short time. Moreover, since the premixed gas formed by the pilot injection combusts in an early stage of the main combustion, the injection quantity by the main injection can be reduced In consequence, the combustion gas temperature can be reduced to reduce a production of the NOx.

The ECU 50 (fuel injection control device) calculates a target injection quantity and target injection timing of the fuel to be injected during one combustion cycle for each one of the injectors 21 based upon engine rotation speed sensed by the crank angle sensor 41, parameters relating to an engine load and the like. The parameters relating to the engine load include the accelerator operation amount ACCP of the driver sensed with the accelerator sensor 42, the opening degree of the throttle valve 16 sensed with the throttle position sensor 16a, intake pressure and the like. Further, the ECU 50 calculates a target injection quantity and target injection timing of each of the main injection and the pilot injection based upon the parameters relating to the engine load, the engine rotation speed and the like.

Hereinafter, the control of the fuel injection quantity of the pilot injection will be explained in detail with reference to flowcharts shown in FIGS. 2 to 4. This processing is repeatedly executed in a predetermined cycle (for example, a cycle of 10 msec) by the microcomputer (CPU or DSP) in the ECU 50.

Figure 2:
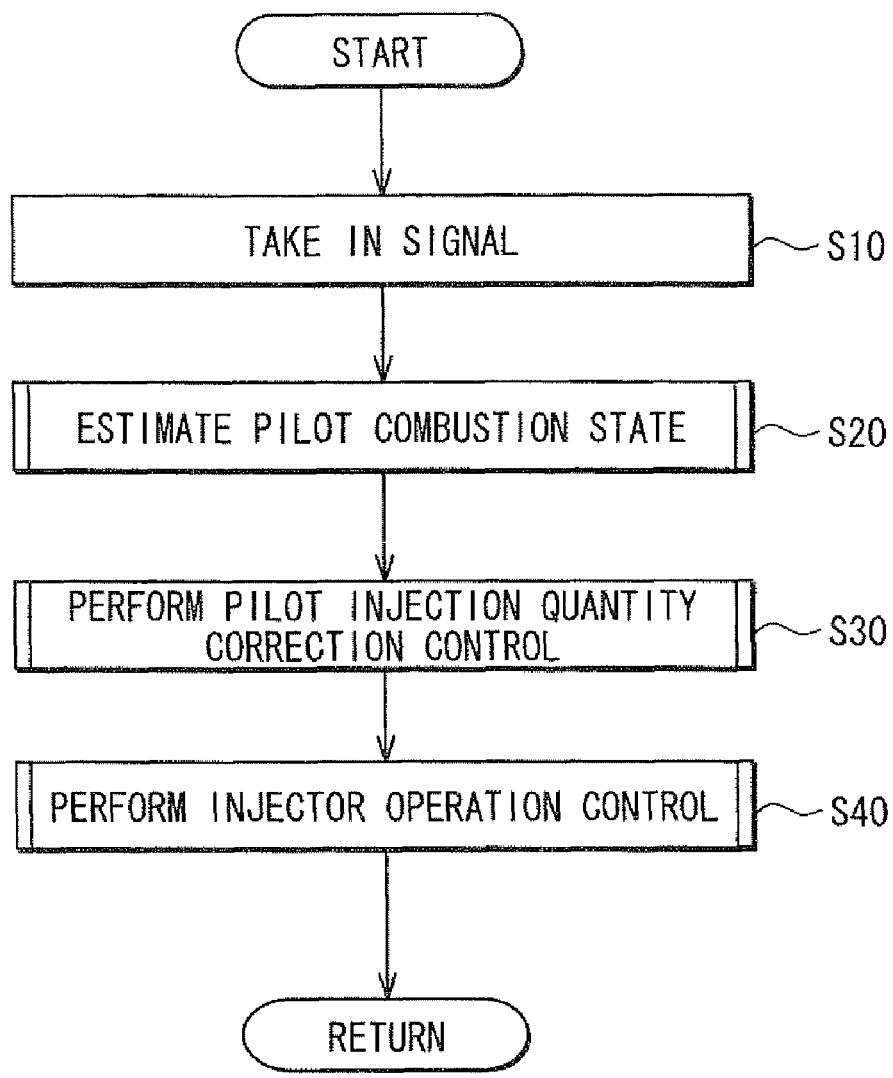
FIG. 2 is a flowchart showing a control procedure of a pilot injection quantity executed by an ECU according to the first embodiment.

First, in S10 (an acquiring section) of the flowchart shown in FIG. 2, a cylinder pressure signal (a cylinder pressure sensing value) sensed with the cylinder pressure sensor 20a is acquired. Then, in S20 (a first combustion state estimating section), a combustion state of the fuel (for example, the injection quantity) injected by the pilot injection is estimated based upon the cylinder pressure attributable to the main combustion (i.e., the cylinder pressure as of the main combustion: hereinafter referred to as main combustion timing cylinder pressure or second combustion timing cylinder pressure) among the acquired cylinder pressure sensing values.

As described above, the ECU 50 calculates the target injection quantity of the pilot injection based upon the engine load and the engine rotation speed. In following S30, the target injection quantity is corrected based upon the estimated combustion state of the pilot combustion to approximate the actual injection quantity estimated in S20 to the pilot injection quantity based on the calculated target injection quantity. Then, in S40, an operation of the injector 21 (for example, a valve-opening period) is controlled to achieve the target injection quantity corrected in S20.

Figure 3:
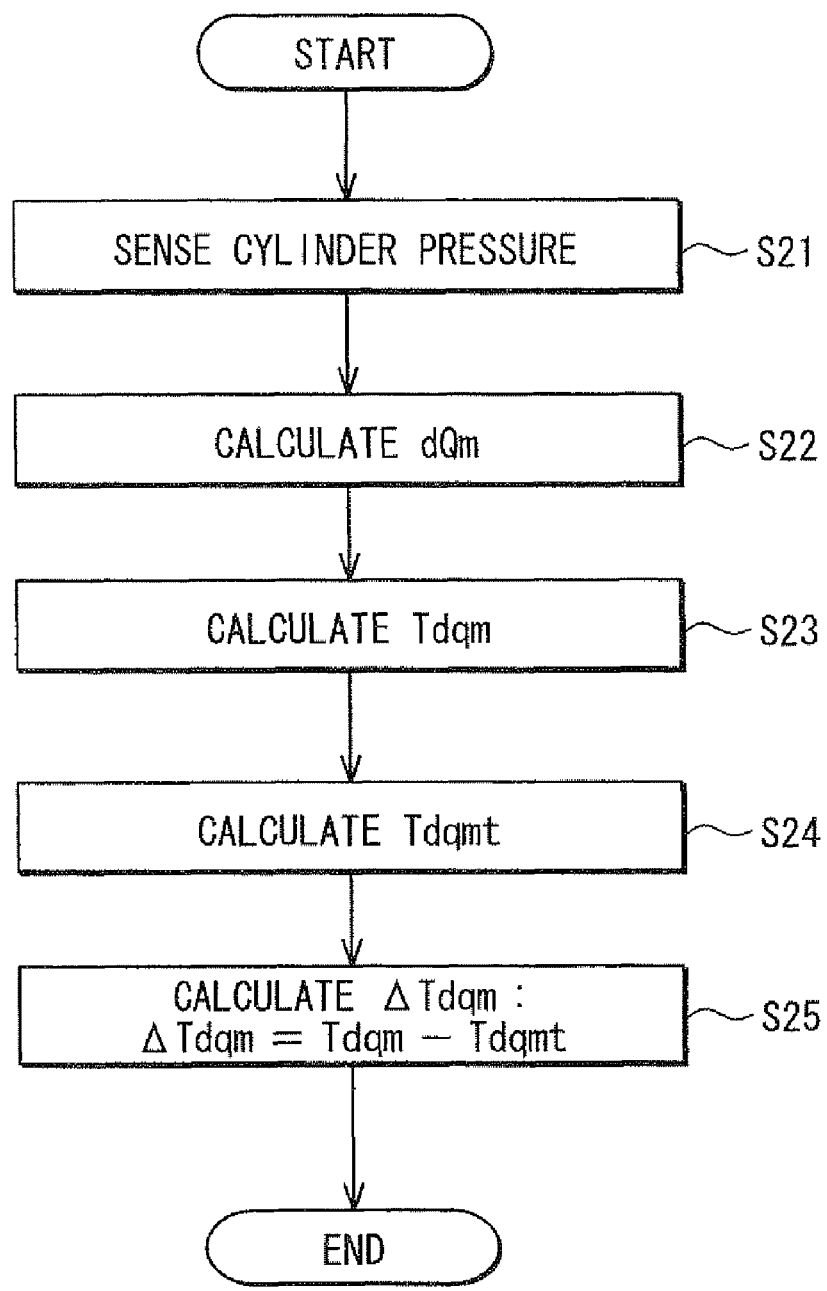
FIG. 3 is a flowchart showing subroutine processing for estimating a pilot combustion state according to the first embodiment.

FIG. 3 shows subroutine processing for estimating the state of the pilot combustion in S20. First, in S21, the main combustion timing cylinder pressure attributable to the main combustion is sensed out of the cylinder pressure sensing values acquired in S10. For example, it is preferable to obtain a cylinder pressure sensing value after the TDC as the main combustion timing cylinder pressure.

Assuming that a heat amount generated through the combustion per unit time (a predetermined crank angle) is a heat release rate, in S22, a heat release rate dQm by the main combustion is calculated based upon at least the main combustion timing cylinder pressure. Hereafter, an example of a calculation method of the heat release rate dQm will be explained.

A cylinder inner volume $V\theta$ is expressed by following Expression 1, $$V\theta = Vc + \pi \times \frac{B^2}{4} \times \left( L + \frac{S}{2} - \left( \frac{S}{2}\cos\theta c + \sqrt{L^2 - \left(\frac{S}{2}\cos\theta c\right)^2} \right) \right) \quad \text{Expression 1}$$

In Expression 1, Vc represents a clearance volume (m³), S is a piston stroke (m), L is connecting rod length (m), and $\theta c$ is a crank angle (deg). A differential value defined by the cylinder inner volume $V\theta$ and the crank angle $\theta c$ may be calculated in real time every time the crank angle $\theta c$ is updated or may be calculated in advance and sequentially read from a map data stored in a memory. A differential value defined by the cylinder pressure Pc and the crank angle $\theta c$ can be acquired by processing the sensing signal of the cylinder pressure sensor 20a with the DSP A heat release rate q (=dQ/d$\theta$c) is calculated by following Expression 2. Assuming that a ratio K Of specific heat is constant, following Expression 2 is calculated in real time.

$$q = \frac{dQ}{d\theta c} = \frac{1}{\kappa-1}\left(V\theta \cdot \frac{dP\theta}{d\theta c} + \kappa \cdot P\theta \cdot \frac{dV\theta}{d\theta c}\right) \quad \text{Expression 2}$$

Figure 5:
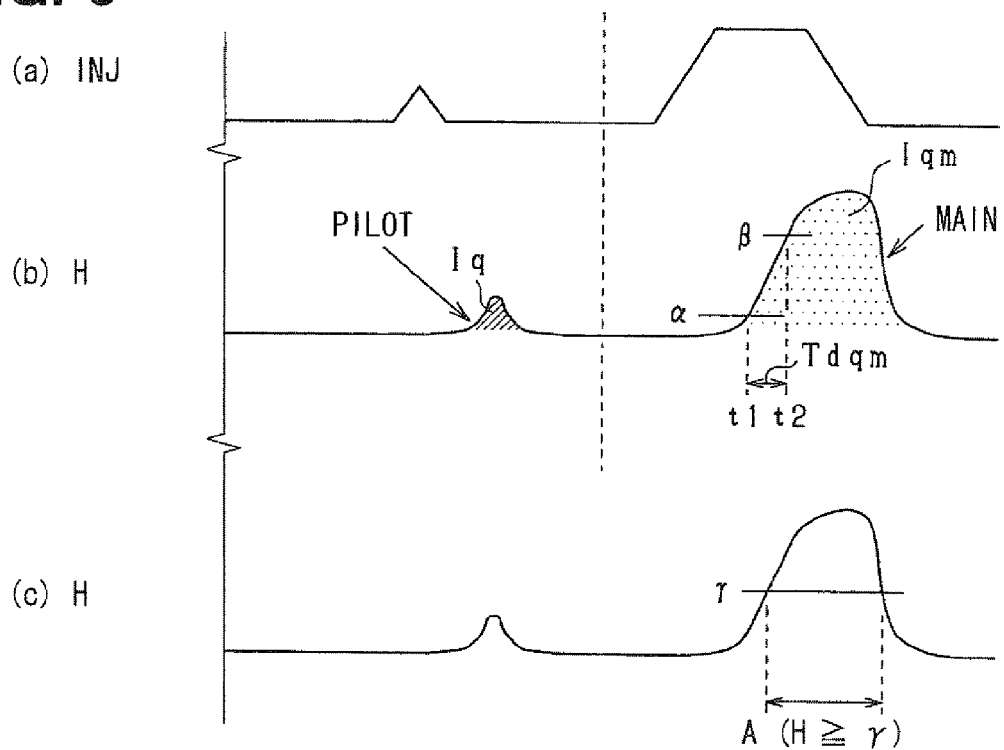
FIG. 5 is a timing chart showing a change of a heat release rate due to a pilot injection and a main injection according to the first embodiment.

An actual change of the heat release rate H occurs in a mode shown in part (b) of FIG. 5. Part (a) of FIG. 5 shows a change of an injection command signal INJ (a target injection quantity). A horizontal axis of each of parts (a) and (b) of FIG. 5 represents an elapse of time. Part (a) of FIG. 5 shows that an injection period of the pilot injection is shorter than that of the main injection. In accordance with this, part (b) of FIG. 5 shows that the pilot injection quantity is smaller than the main injection quantity and a heat production by the pilot injection (shown by a shaded area Iq) is smaller than the heat production by the main injection (shown by a dotted area Iqm).

Then, in S23, a time actually required for the main heat release rate dQm to increase by a predetermined amount, i.e., a rising period Tdqm shown in part (b) of FIG. 5 l is calculated. More specifically, a first time t1 when the main heat release rate dQm reaches a first threshold value α and a second time t2 when the main heat release rate dQm reaches a second threshold value β are sensed, and the rising period Tdqm is calculated from a difference between the times t1, t2. It can be said that the rising period Tdqm represents combustion speed of the main combustion. That is, it can be said that the combustion speed is slower as the rising period Tdqm is longer.

Then, in S24, a target rising period Tdqmt is calculated. More specifically, as described above, a map showing a relationship between the target rising period Tdqmt and at least one of the engine load, the engine rotation speed and the target injection quantity is beforehand stored in the ROM, the EEPROM or the like, and the target rising period Tdqmt is calculated using the map. It is preferable to set the map as a base map and to correct the target rising period Tdqmt calculated from the base map with at least one of an EGR rate, an EGR gas quantity and EGR gas temperature.

Then, in S25, a deviation ΔTdqm (=Tdqm−Tdqmt) between the rising period Tdqm calculated in S23 and the target rising period Tdqmt calculated in S24 is calculated. The pilot injection quantity (as the combustion state) affects not only the pilot combustion by the pilot injection but also the main combustion. Further, since the main injection quantity is larger than the pilot injection quantity, if the pilot injection quantity changes, a larger change occurs in the main combustion timing cylinder pressure than in the cylinder pressure attributable to the pilot combustion (i.e., the cylinder pressure as of the pilot combustion: hereinafter referred to as pilot combustion timing cylinder pressure).

In view of this respect, in the subroutine processing of S20 (S21 to S25), the rising period deviation ΔTdqm is estimated as a value relating to the pilot injection quantity, which largely affects the pilot combustion state. That is, when the actual pilot injection quantity qpinj is smaller than the target value (refer to part (a) of FIG. 6), the rising period Tdqm is shorter than in the case where the actual pilot injection quantity qpinj is equal to the target value (refer to part (b) of FIG. 6). Therefore, the deviation ΔTdqm (=Tdqm−Tdqmt) becomes a negative value. When the actual pilot injection quantity qpinj is larger than the target value (refer to part (c) of FIG. 6), the rising period Tdqm is longer than in the case where the actual pilot injection quantity qpinj is equal to the target value. Therefore, the deviation ΔTdqm becomes a positive value.

Figure 6:
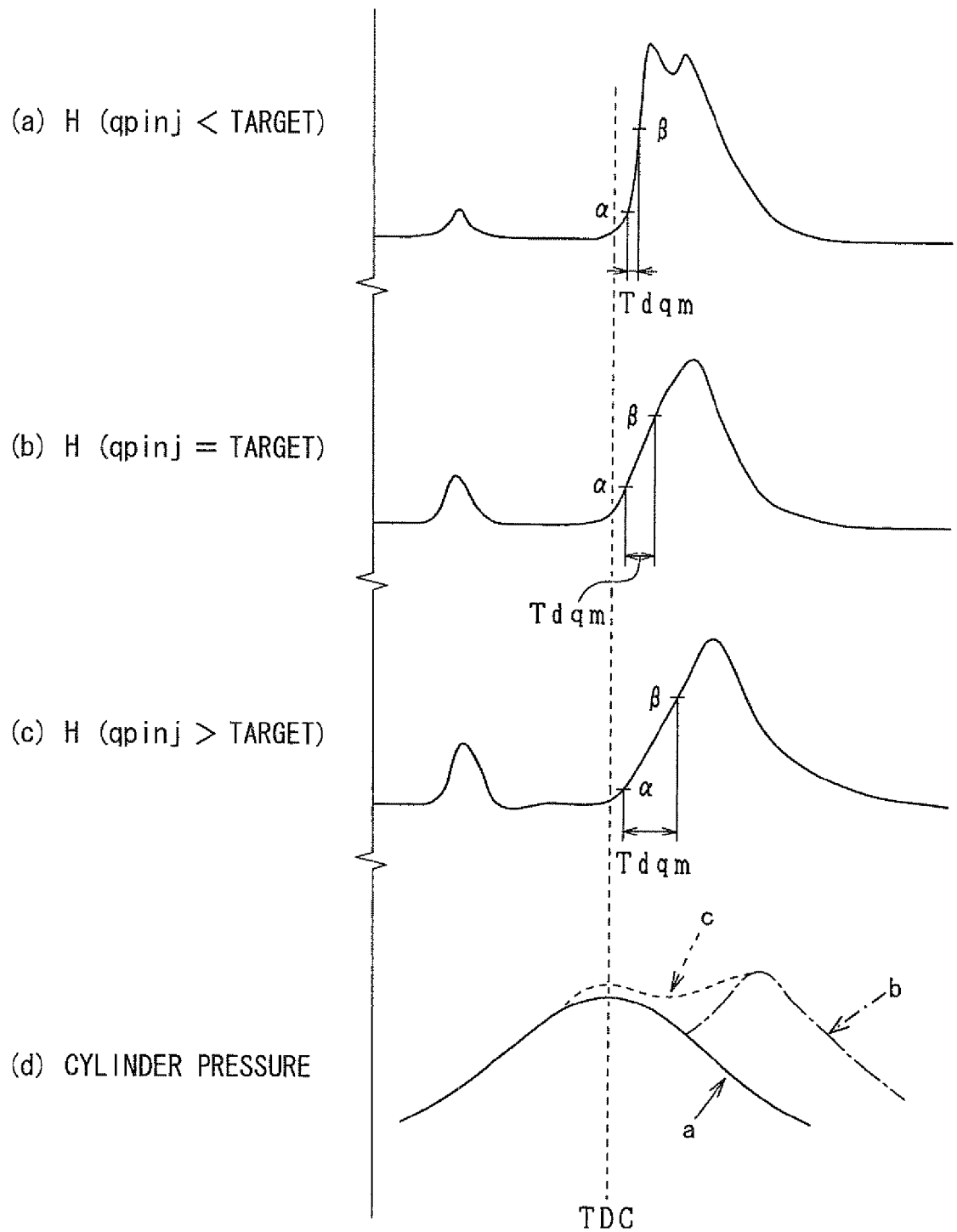
FIG. 6 is a timing chart showing a change of a rising period of the main injection due to a change of the pilot injection quantity according to the first embodiment.

A horizontal axis of the graph shown in FIG. 6 indicates an elapse of time. A vertical axis of each of parts (a), (b) and (c)

of FIG. 6 indicates the heat release rate H. A vertical axis of part (d) of FIG. 6 indicates a sensing value of the cylinder pressure sensor 20a. A solid line "a" in part (d) of FIG. 6 shows a cylinder pressure change in a non-combustion period (i.e., an exhaust stroke), and a chained line "b" and a dotted line "c" show cylinder pressure changes in a combustion period (i.e., a combustion stroke). The chained line b in part (d) of FIG. 6 shows a cylinder pressure change in the case where only the main injection is performed without performing the pilot injection. The dotted line c in part (d) of FIG. 6 shows a cylinder pressure change in the case where the pilot injection is performed before the main injection. Each of parts (a) to (c) of FIG. 6 shows a change of the heat release rate H calculated based upon the cylinder pressure change shown by the dotted line c in part (d) of FIG. 6.

Figure 4:
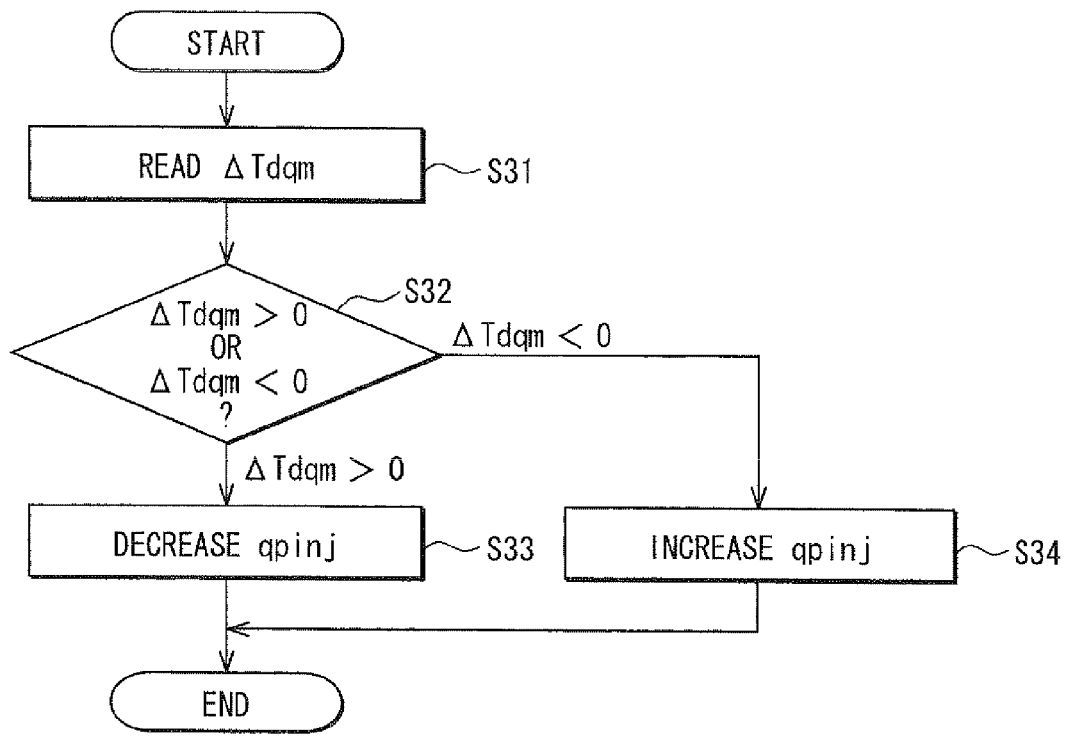
FIG. 4 is a flowchart showing subroutine processing for correcting the pilot injection quantity according to the first embodiment.

FIG. 4 shows subroutine processing for correcting the pilot injection quantity in S30. First, in S31, the rising period deviation ΔTdqm calculated in S25 is read. In following S32, it is determined whether the deviation ΔTdqm is a positive value or a negative value.

When the deviation ΔTdqm is determined to be the positive value, it is determined that the actual pilot injection quantity qpinj is larger than the target value, and the target value is corrected to reduce the pilot injection quantity qpinj in S33. When the deviation ΔTdqm is determined to be the negative value, it is determined that the actual pilot injection quantity qpinj is smaller than the target value, and the target value is corrected to increase the pilot injection quantity qpinj in S34. When the value of the deviation ΔTdqm is zero, the series of the processing in S30 (S31 to S34) is ended without correcting the target value of the pilot injection quantity qpinj.

The above-described embodiment exerts following excellent effects.

(1) The actual injection quantity (the combustion state) by the pilot injection is estimated based upon the sensing value related to the main combustion timing cylinder pressure among the cylinder pressure sensing values. The change in the main combustion timing cylinder pressure accompanying the change of the pilot injection quantity is larger than the change in the pilot combustion timing cylinder pressure. Therefore, an accuracy level required of the cylinder pressure sensor 20a can be reduced as compared to the case of estimating the pilot injection quantity based upon the pilot combustion timing cylinder pressure, which changes only slightly.

(2) The actual pilot injection quantity is estimated based upon the time (i.e., the rising period Tdqm) necessary for the heat release rate by the main combustion to change by a predetermined amount. That is, when the rising period Tdqm is shorter than the period calculated from the target value, it is determined (estimated) that the actual pilot injection quantity qpinj is small, and the target value of the pilot injection quantity qpinj is corrected and increased. When the rising period Tdqm is longer than the period calculated from the target value, it is determined (estimated) that the actual pilot injection quantity qpinj is large, and the target value of the pilot injection quantity qpinj is corrected and decreased.

As compared to the heat production Iqm (shown by the dotted area in part (b) of FIG. 5) calculated by integrating the heat release rate H, a sensing error of the heat release rate H (i.e., a cylinder pressure sensing error) contained in the rising period Tdqm, which does not require the integration, is small. Accordingly, the estimation accuracy of the actual pilot injection quantity can be improved. This means that the accuracy level required of the cylinder pressure sensor 20a can be further reduced.

(3) The change of the main heat release rate dQm due to the change of the pilot injection quantity is larger when the main heat release rate dQm increases than when the main heat release rate dQm decreases. In the present embodiment made in view of this respect, the target value of the pilot injection quantity qpinj is corrected based upon the rising period Tdqm, in which the main heat release rate dQm increases by a predetermined amount. Therefore, the estimation accuracy of the pilot injection quantity can be improved as compared to the period in which the main heat release rate dQm decreases by the predetermined amount. This means that the accuracy level required of the cylinder pressure sensor 20a can be further reduced.

When the actual main injection quantity deviates from the target quantity, the deviation amount affects the change of the main heat release rate dQm during the increase of the main heat release rate dQm. However, the change of the pilot injection quantity affects the change during the increase more than the deviation amount. Therefore, when the pilot injection quantity is estimated based upon the change of the main heat release rate dQm during the increase, the estimation accuracy is less likely to be affected by the deviation amount of the actual main injection quantity.

Figure 7:
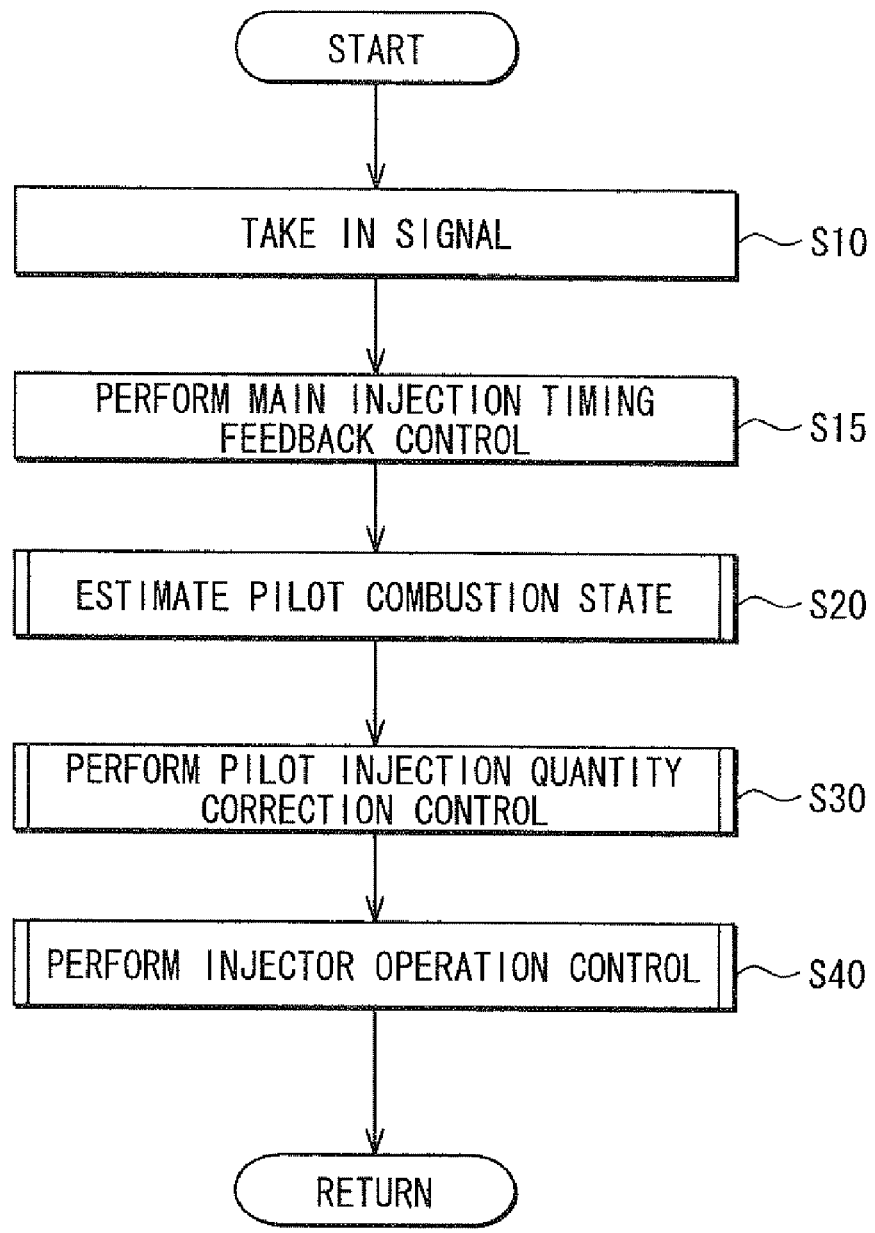
FIG. 7 is a flowchart showing a control procedure of a pilot injection quantity according to a second embodiment of the present invention.

Next, a second embodiment of the present invention will be described. In the second embodiment, processing shown in FIG. 7 is performed in place of the processing shown in FIG. 2 of the first embodiment. In the processing shown in FIG. 7, processing in S15 (a second injection timing control section) is executed before the processing of estimating the pilot injection quantity based upon the main combustion timing cylinder pressure in S20. In S15, feedback control of the injection timing of the main injection is performed to approximate the actual ignition timing, at which the fuel injected by the main injection actually ignites, to target ignition timing.

Figure 8:
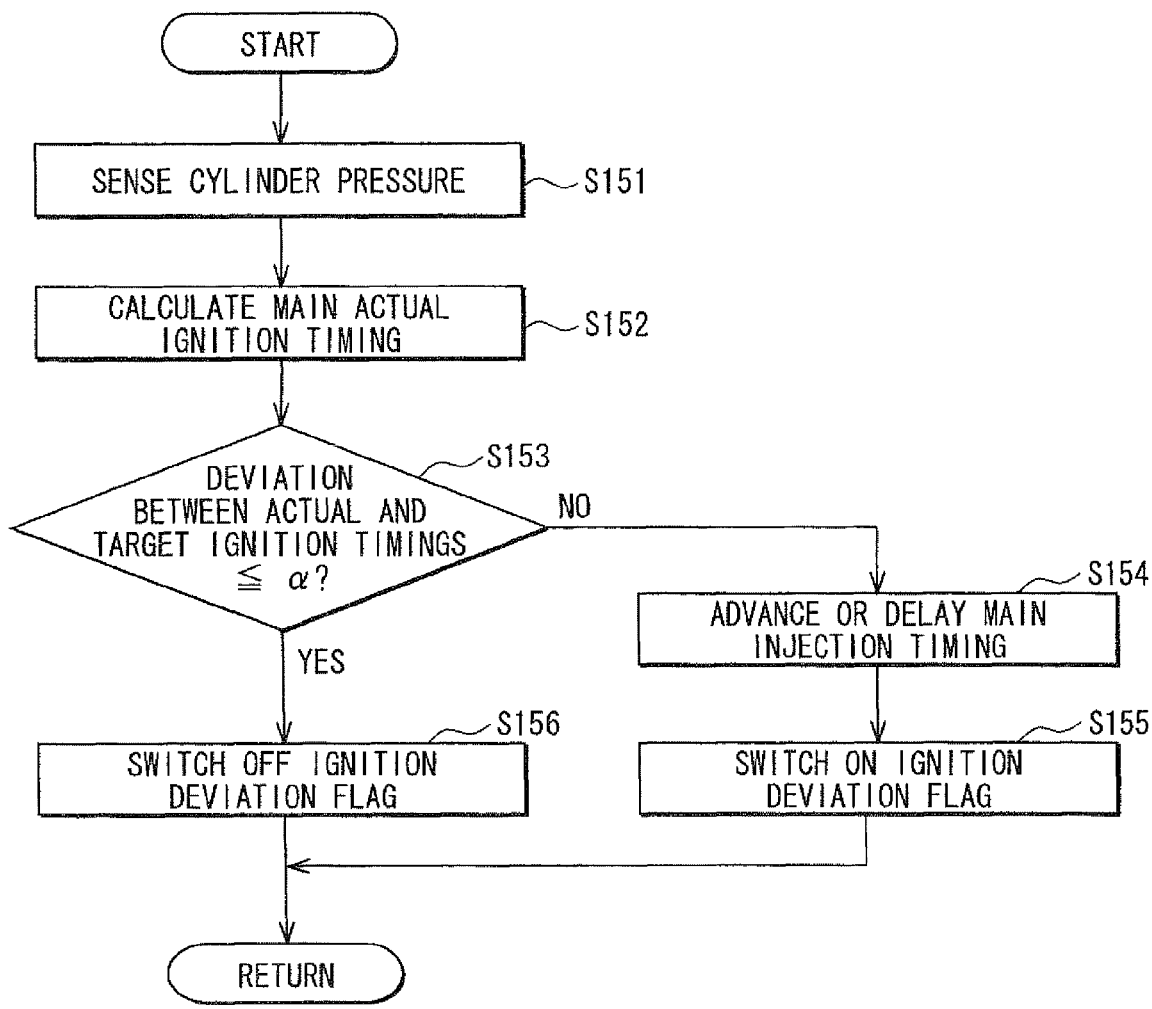
FIG. 8 is a flowchart showing subroutine processing according to the second embodiment.

FIG. 8 shows subroutine processing of S15 of performing the feedback-control of the injection timing. First in S151, the main combustion timing cylinder pressure attributable to the main combustion is sensed out of the cylinder pressure sensing values acquired in S10. For example, it is preferable to sense the cylinder pressure sensing value after the TDC as the main combustion timing cylinder pressure.

Then, in S152, actual ignition timing of the main injection fuel is calculated based upon the main combustion timing cylinder pressure sensed in S151. For example, it is preferable to calculate the actual ignition timing based upon the timing when the main combustion timing cylinder pressure is maximized during one combustion cycle or to calculate the actual ignition timing based upon the timing when the increase rate of the main combustion timing cylinder pressure is maximized during one combustion cycle.

Then, in S153, it is determined whether a deviation between the actual ignition timing calculated in S152 and the target ignition timing is "equal to or less than" a predetermine value α. The target ignition timing is calculated from a map or the like set beforehand in accordance with engine rotation speed and the engine load.

When it is determined that the deviation between the actual ignition timing and the target ignition timing is not "equal to or less than" the predetermine value α (S153: NO), the process goes to S154 where the main injection timing is advanced or delayed to approximate the deviation to zero. Thereafter, in S155, an ignition deviation flag is switched on. When it is determined that the deviation between the actual ignition timing and the target ignition timing is "equal to or less than" the predetermine value α (S153: YES), in S156 the ignition deviation flag is switched off and the series of the subroutine processing from S151 to S156 is ended.

The processing in S20 and S30 shown in FIG. 7 is not executed when the ignition deviation flag is on. In consequence, when the ignition deviation flag is on, an operation of the injector 21 is controlled in S40 based upon the target injection quantity not corrected in S30. That is, the estimation processing of the pilot injection quantity in S20 is executed on a condition that the deviation between the actual ignition timing and the target ignition timing becomes equal to or less than the predetermine value through the processing of S15 as described above.

In a state where the deviation between the actual ignition timing and the target ignition timing is large, although the pilot injection quantity affects the rising period of the main combustion, the correlation between the pilot injection quantity and the rising period is weak. Therefore, it is difficult to estimate the pilot injection quantity in such the state. In this regard in the present embodiment, the pilot injection quantity is estimated based upon the main combustion timing cylinder pressure at the time when the deviation between the actual ignition timing and the target ignition timing is equal to or less than the predetermined amount. Therefore, the estimation accuracy can be improved.

The present invention is not limited to the above-described embodiments but may be modified and implemented as follows, for example. Moreover, characteristic constructions of the embodiments may be combined with each other arbitrarily.

In the above embodiments, after the sensing value of the cylinder pressure sensor 20a shown in part (d) of FIG. 6 is acquired, the heat release rate H shown in each of parts (a), (b) and (c) of FIG. 6 is calculated based upon the sensing value, and the pilot injection quantity is estimated based upon the change of the calculated main heat release rate dQm. Alternatively, the calculation of the heat release rate based upon the cylinder pressure may be eliminated, and the pilot injection quantity may be estimated directly based upon the change of the cylinder pressure. Expression 2 described above is for calculating the heat release rate based upon the cylinder pressure, and there is a correlation between the calculated heat release rate and the pilot injection quantity. Therefore, it is preferable to calculate the pilot injection quantity based upon the cylinder pressure with the use of a mathematical expression made by combining the correlation and Expression 2.

In the above embodiments, the target value of the pilot injection quantity qpinj is corrected based upon the time (i.e., the rising period Tdqm) actually required for the main heat release rate dQm to increase by the predetermined amount. Alternatively, as shown in part (c) of FIG. 5, the correction may be performed based upon length of period in which the heat release rate H is higher than a predetermined value γ. Alternatively, the correction may be performed based upon an inclination (an increase amount per unit time) of the main heat release rate dQm at the time when the main heat release rate dQm increases. Alternatively, the correction may be performed based upon an increase amount of the main heat release rate dQm achieved in a predetermined time.

In the above embodiments, the pilot injection quantity is estimated based upon the time (for example, the rising period Tdqm) required for the main combustion timing cylinder pressure sensing value to change by the predetermined amount. Alternatively, the pilot injection quantity may be estimated based upon a change amount of the main combustion timing cylinder pressure sensing value caused during a predetermined time. For example, main heat release rates dQm at first time t1 and second time t2 may be sensed respectively and a difference between the main heat release rates dQm may be calculated as the change amount mentioned above. Also with such the method, the estimation accuracy of the actual pilot injection quantity can be improved since the sensing error (cylinder pressure sensing error) of the heat release rate contained in the change amount mentioned above is smaller than in the heat production Iqm (shown by the dotted area in part (b) of FIG. 5) acquired by integrating the heat release rate dQm.

In the above embodiments, the pilot injection quantity is estimated based upon the rising period Tdqm of the heat release rate dQm of the main combustion. Alternatively, the pilot injection quantity may be estimated based upon the heat production Iqm (shown by the dotted area in part (b) of FIG. 5) acquired by integrating the heat release rate. In this case, the heat production Iqm reflects a change process of the main heat release rate dQm in the rising period in which the main heat release rate dQm reaches from the first threshold value α to the second threshold value β or in the period in which the main heat release rate dQm is higher than the predetermined value γ. Therefore, the estimation result of the pilot injection quantity reflecting such the change process can be acquired. However, this scheme suffers from a disadvantage that a large sensing error (cylinder pressure sensing error) of the main heat release rate dQm is contained as described above.

In the above embodiments, the cylinder pressure sensor 20a is provided in each of the multiple cylinders. Alternatively the cylinder pressure sensor 20a may be provided to only one cylinder. Even when an aging change occurs in the engine due to a compression ratio change or the like in such the construction, the fuel injection quantity can be corrected in accordance with the aging change. However, correction corresponding to aging changes in injection characteristic variations of the multiple injectors 21 cannot be performed.

In the above embodiments, the combustion state (the injection quantity) of the fuel injected by the pilot injection is estimated based upon the combustion state of the fuel injected by the main injection. Alternatively, the present invention may be applied to a pre-injection for injecting fuel after the pilot injection and before the main injection, and a combustion state of the fuel injected by the pre-injection may be estimated based upon the combustion state of the fuel injected by the main injection. Alternatively, both combustion states of the pilot injection and the pre-injection may be estimated based upon the combustion state of the fuel injected by the main injection. The present invention is not limited to estimation of the combustion state of the fuel injected by the pilot injection or the pre-injection based upon the combustion state of the fuel injected by the main injection. Rather, the present invention may be applied to estimation of a combustion state of fuel injected by a first injection, which is performed before a second injection in multi-injection, based upon a combustion state of fuel injected by the second injection. This case assumes that the second injection quantity is larger than the first injection quantity.

In the above embodiments, the target value of the injection quantity (i.e., the combustion state) of the pilot injection is corrected based upon the combustion state of the fuel injected by the main injection. Alternatively, the target value of the pilot injection timing (i.e., the combustion state) may be corrected. For example, even with the same pilot injection quantity the rising period Tdqm shortens as shown in part (a) of FIG. 6 when the actual pilot injection timing is earlier than desired timing, and the rising period Tdqm lengthens as shown in part (c) of FIG. 6 when the actual pilot injection timing is later than the desired timing. Therefore, processing of advancing the injection timing may be performed in place of the injection quantity reducing processing in S33 and processing of delaying the injection timing may be performed in place of the injection quantity increasing processing in S34.

In the above embodiments, the electromagnetically driven injector 21 is adopted. Alternatively, a piezo injector using a piezoelectric element as an actuator for controlling the combustion state (for example, injection time or injection rate) may be adopted.

In the above embodiments, the injection quantity of the main injection is set larger than the injection quantity of the first injection. Alternatively, the main injection quantity may be set to be equal to or smaller than the first injection quantity if the setting is made such that the fuel injected by the main injection ignites near the compression top dead center within the injection period.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection control device for controlling an operation of an injector such that fuel to be injected into a combustion chamber per combustion cycle is divided and injected at least through a first injection and a second injection that is performed after the first injection and that injects a larger quantity of the fuel than the first injection, the fuel injection control device comprising:
    an acquiring means for acquiring a sensing value of cylinder pressure in the combustion chamber sensed with a cylinder pressure sensor; and
    a first combustion state estimating means for estimating an actual combustion state of the fuel injected by the first injection based upon a second combustion timing cylinder pressure sensing value attributable to combustion of the fuel injected by the second injection out of the cylinder pressure sensing values; wherein
    the first combustion state estimating means calculates a heat release rate attributable to the combustion of the fuel injected by the second injection based upon the second combustion timing cylinder pressure sensing value and estimates the combustion state based upon the heat release rate; and
    the first combustion state estimating means estimates the combustion state based upon a time required for the heat release rate to change by a predetermined amount.

2. The fuel injection control device as in claim 1, wherein the combustion state estimated by the first combustion state estimating means includes at least one of a heat production by the first injection and an actual injection quantity of the first injection.

3. The fuel injection control device as in claim 1, wherein the first combustion state estimating means estimates the combustion state based upon the second combustion timing cylinder pressure sensing value at the time when the second combustion timing cylinder pressure sensing value increases.

4. The fuel injection control device as in claim 1, wherein the first combustion state estimating means estimates the combustion state based upon a time required for the second combustion timing cylinder pressure sensing value to change by a predetermined amount.

5. The fuel injection control device as in claim 4, wherein the predetermined amount is set as an increase amount of the second combustion timing cylinder pressure sensing value at the time when the second combustion timing cylinder pressure sensing value increases.

6. The fuel injection control device as in claim 1, wherein the first combustion state estimating means estimates the combustion state based upon a time in which the second combustion timing cylinder pressure sensing value is greater than a predetermined value.

7. The fuel injection control device as in claim 1, wherein the predetermined amount is set as an increase amount of the heat release rate at the time when the heat release rate increases.

8. The fuel injection control device as in claim 1, wherein the second injection is a main injection, an injection quantity and injection timing of which are controlled to produce main part of output torque during one combustion cycle.

9. The fuel injection control device as in claim 8, wherein the first injection is a pilot injection that completes fuel injection before a compression top dead center, an injection quantity and injection timing of the pilot injection being controlled such that a part of the fuel injected through the pilot injection combusts together with the fuel injected through the main injection after a premixing period.

10. The fuel injection control device as in claim 1 further comprising:
    a second injection timing control means for performing feedback-control of injection timing of the second injection to approximate actual ignition timing, at which the fuel injected through the second injection actually ignites, to target ignition timing calculated in accordance with an operation state of an internal combustion engine, wherein
    the first combustion state estimating means estimates the combustion state based upon the second combustion timing cylinder pressure sensing value at the time when a deviation between the actual ignition timing and the target ignition timing is less than a predetermined amount.

11. A fuel injection control device for controlling an operation of an injector such that fuel to be injected into a combustion chamber per combustion cycle is divided and injected at least through a first injection and a second injection performed after the first injection, wherein the second injection is a main injection, an injection quantity and injection timing of which are controlled to produce main part of output torque during the combustion cycle, the fuel injection control device comprising:
    an acquiring means for acquiring a sensing value of cylinder pressure in the combustion chamber sensed with a cylinder pressure sensor; and
    a first combustion state estimating means for estimating an actual combustion state of the fuel injected by the first injection based upon a second combustion timing cylinder pressure sensing value attributable to combustion of the fuel injected by the second injection out of the cylinder pressure sensing values; wherein
    the first combustion state estimating means calculates a heat release rate attributable to the combustion of the fuel injected by the second injection based upon the second combustion timing cylinder pressure sensing value and estimates the combustion state based upon the heat release rate; and
    the first combustion state estimating means estimates the combustion state based upon a time required for the heat release rate to change by a predetermined amount.

12. A fuel injection control system comprising:
- at least one of an injector for injecting fuel into a combustion chamber and a cylinder pressure sensor for sensing cylinder pressure in the combustion chamber; and
- a fuel injection control device for controlling an operation of the injector such that fuel to be injected into the combustion chamber per combustion cycle is divided and injected at least through a first injection and a second injection that is performed after the first injection and that injects a larger quantity of the fuel than the first injection, wherein
- the fuel injection control device includes an acquiring means for acquiring a sensing value of the cylinder pressure in the combustion chamber sensed with the cylinder pressure sensor and a first combustion state estimating means for estimating an actual combustion state of the fuel injected by the first injection based upon a second combustion timing cylinder pressure sensing value attributable to combustion of the fuel injected by the second injection out of the cylinder pressure sensing values;
- the first combustion state estimating means calculates a heat release rate attributable to the combustion of the fuel injected by the second injection based upon the second combustion timing cylinder pressure sensing value and estimates the combustion state based upon the heat release rate; and
- the first combustion state estimating means estimates the combustion state based upon a time required for the heat release rate to change by a predetermined amount.

13. The fuel injection control system as in claim 12, wherein
- the combustion state estimated by the first combustion state estimating means includes at least one of a heat production by the first injection and an actual injection quantity of the first injection.

14. The fuel injection control system as in claim 12, wherein
- the first combustion state estimating means estimates the combustion state based upon the second combustion timing cylinder pressure sensing value at the time when the second combustion timing cylinder pressure sensing value increases.

15. The fuel injection control system as in claim 12, wherein
- the first combustion state estimating means estimates the combustion state based upon a time required for the second combustion timing cylinder pressure sensing value to change by a predetermined amount.

16. The fuel injection control system as in claim 15, wherein
- the predetermined amount is set as an increase amount of the second combustion timing cylinder pressure sensing value at the time when the second combustion timing cylinder pressure sensing value increases.

17. The fuel injection control system as in claim 12, wherein
- the first combustion state estimating means estimates the combustion state based upon a time in which the second combustion timing cylinder pressure sensing value is greater than a predetermined value.

18. The fuel injection control system as in claim 12, wherein
- the predetermined amount is set as an increase amount of the heat release rate at the time when the heat release rate increases.

19. The fuel injection control system as in claim 12, wherein
- the second injection is a main injection, an injection quantity and injection timing of which are controlled to produce main part of output torque during one combustion cycle.

20. The fuel injection control system as in claim 19, wherein
- the first injection is a pilot injection that completes fuel injection before a compression top dead center, an injection quantity and injection timing of the pilot injection being controlled such that a part of the fuel injected through the pilot injection combusts together with the fuel injected through the main injection after a premixing period.

21. The fuel injection control system as in claim 12, wherein
- the fuel injection control device further includes a second injection timing control means for performing feedback-control of injection timing of the second injection to approximate actual ignition timing, at which the fuel injected through the second injection actually ignites, to target ignition timing calculated in accordance with an operation state of an internal combustion engine, and
- the first combustion state estimating means estimates the combustion state based upon the second combustion timing cylinder pressure sensing value at the time when a deviation between the actual ignition timing and the target ignition timing is less than a predetermined amount.

22. A fuel injection control system comprising:
- at least one of an injector for injecting fuel into a combustion chamber and a cylinder pressure sensor for sensing cylinder pressure in the combustion chamber; and
- a fuel injection control device for controlling an operation of the injector such that fuel to be injected into the combustion chamber per combustion cycle is divided and injected at least through a first injection and a second injection performed after the first injection, wherein
- the second injection is a main injection, an injection quantity and injection timing of which are controlled to produce main part of output torque during the combustion cycle, and
- the fuel injection control device includes an acquiring means for acquiring a sensing value of the cylinder pressure in the combustion chamber sensed with the cylinder pressure sensor and a first combustion state estimating means for estimating an actual combustion state of the fuel injected by the first injection based upon a second combustion timing cylinder pressure sensing value attributable to combustion of the fuel injected by the second injection out of the cylinder pressure sensing values;
- the first combustion state estimating means calculates a heat release rate attributable to the combustion of the fuel injected by the second injection based upon the second combustion timing cylinder pressure sensing value and estimates the combustion state based upon the heat release rate; and
- the first combustion state estimating means estimates the combustion state based upon a time required for the heat release rate to change by a predetermined amount.

* * * * *